(12) United States Patent
Hermanns

(10) Patent No.: US 7,216,354 B2
(45) Date of Patent: May 8, 2007

(54) GUIDANCE OF AN OPTICAL SCANNING DEVICE

(75) Inventor: Ingo Hermanns, Hildesheim (DE)

(73) Assignee: Robert Bosch GmbH, Stuttgart (DE)

(*) Notice: Subject to any disclaimer, the term of this patent is extended or adjusted under 35 U.S.C. 154(b) by 167 days.

(21) Appl. No.: 10/276,263

(22) PCT Filed: May 11, 2001

(86) PCT No.: PCT/DE01/01794

§ 371 (c)(1),
(2), (4) Date: May 7, 2003

(87) PCT Pub. No.: WO01/88909

PCT Pub. Date: Nov. 22, 2001

(65) Prior Publication Data

US 2003/0174636 A1    Sep. 18, 2003

(30) Foreign Application Priority Data

May 13, 2000    (DE) ............................. 100 23 581

(51) Int. Cl.
*G11B 7/085* (2006.01)
*G11B 19/20* (2006.01)

(52) U.S. Cl. ...................................... 720/679

(58) Field of Classification Search ............ 360/266.6, 360/267.4, 267.6, 267.3; 720/679, 676, 663–665; 369/249, 223

See application file for complete search history.

(56) References Cited

U.S. PATENT DOCUMENTS

| 5,448,438 | A | * | 9/1995 | Kasetty | 360/261.3 |
| 5,682,282 | A | | 10/1997 | Kato | 360/266.3 |
| 5,995,479 | A | | 11/1999 | Takizawa et al. | 369/219 |
| 6,052,358 | A | * | 4/2000 | Morikawa et al. | 369/219 |
| 6,058,098 | A | * | 5/2000 | Kato | 369/219 |
| 6,335,915 | B1 | * | 1/2002 | Uchiyama et al. | 369/223 |
| 6,351,444 | B1 | * | 2/2002 | Sogawa et al. | 369/219 |
| 6,373,812 | B2 | * | 4/2002 | Kim et al. | 369/219 |
| 6,414,933 | B1 | * | 7/2002 | Anada et al. | 369/219 |
| 6,577,585 | B2 | * | 6/2003 | Aoyama et al. | 369/255 |
| 6,597,652 | B2 | * | 7/2003 | Obara | 369/249 |
| 6,657,943 | B2 | * | 12/2003 | Muto et al. | 369/219 |
| 2005/0097587 | A1 | * | 5/2005 | Kato et al. | 720/676 |

FOREIGN PATENT DOCUMENTS

| DE | 201 925 | 9/1908 |
| DE | 196 42 343 | 4/1998 |
| GB | 2 217 094 | 10/1989 |
| JP | 58 155 576 | 9/1983 |
| JP | 60 098 564 | 6/1985 |

* cited by examiner

Primary Examiner—Brian E. Miller
(74) Attorney, Agent, or Firm—Kenyon & Kenyon LLP

(57) ABSTRACT

An optical scanning device for reading data stored on a rotating recording medium having a scanning head; at least one guide device for guiding the scanning head along a predefined track; at least one bearing device connected to the scanning head for supporting the at least one guide device and having at least one elastic prestressing device to provide a static prestress on the at least one guide device to prestress the same and the at least one bearing device connected to the scanning head against each other to eliminate a relative displacement.

14 Claims, 4 Drawing Sheets

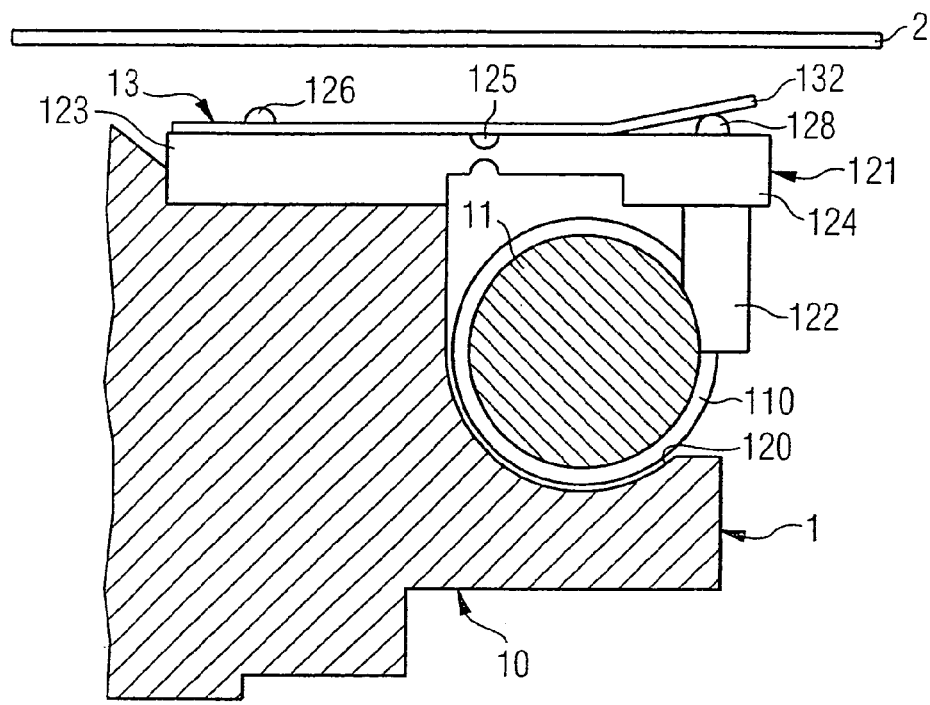
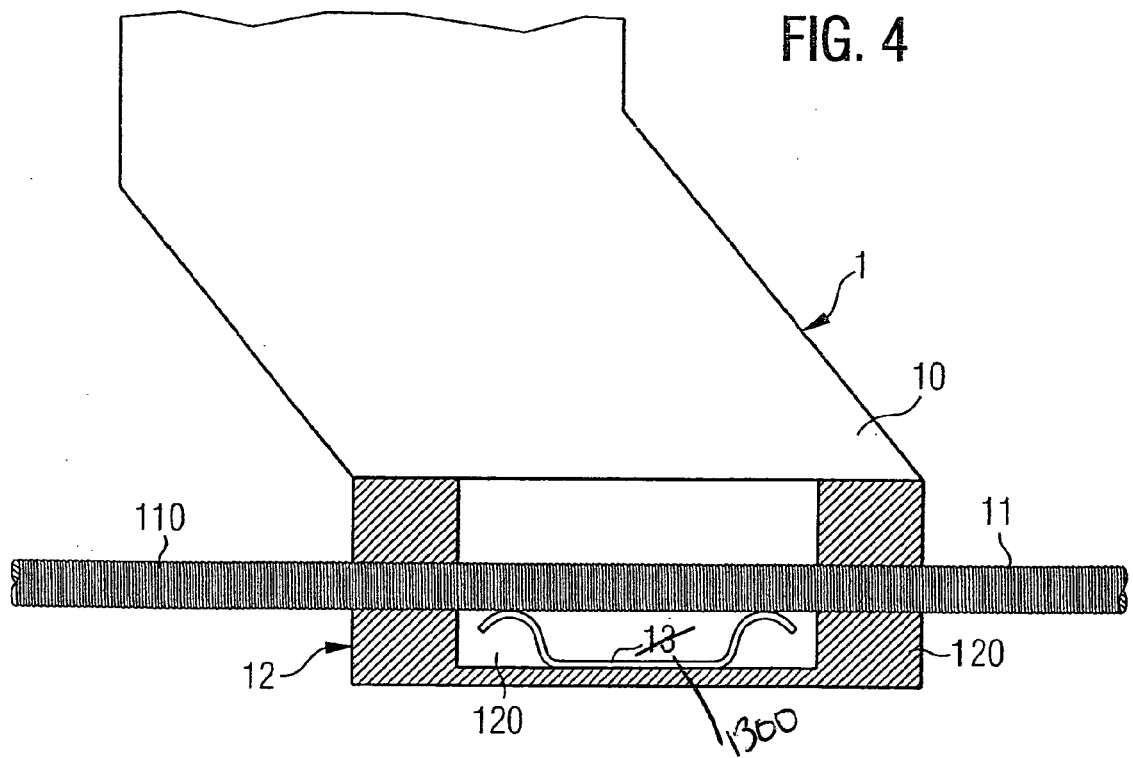

GUIDANCE OF AN OPTICAL SCANNING DEVICE

FIELD OF THE INVENTION

The present invention relates to an optical scanning device for reading stored data on a rotating recording medium, in particular a scanning device having a scanning head, at least one guide device for guiding the scanning head along a predefined track and at least one bearing device connected to the scanning head for supporting the at least one guide device.

BACKGROUND INFORMATION

An optical scanning head of a scanning device is guided along a data track to read data stored on a rotating recording medium.

The scanning head directs a light beam onto the rotating recording medium through a lens attached to the scanning head to acquire the recorded information by scanning the data tracks applied to the recording medium. In order to avoid data reading errors, it is important in particular that the light beam is always guided exactly along the data tracks and is focused on the recording medium.

The housing of, e.g., a compact disc (CD) drive installed in a motor vehicle in particular is exposed to various shocks. If the playback device is subjected to vibrations, inertia forces act on the scanning device. At the same time, changes in the position of the laser beam relative to the data track occur since all components present tend to move with respect to each other due to the inertia forces. However, since the function of the device depends on a continuous exact positioning of the scanning head relative to the recording medium, there is in this case the danger of an interruption of function or data reading.

The tolerance for positional accuracy corresponds roughly to the geometric width of the data tracks. This is equivalent to approximately 1.6 µm in a compact disc and approximately 0.740 µm in a digital video disc (DVD).

The optical scanning head is moved on a radial track under the recording medium. Of critical significance for the vibration performance is the quality of the linear guidance of the optical scanning head on this radial track. In stationary operation, irregularities of guidance are compensated for by adjusting the optics. An electronic regulating device of the optical adjustment is adequately able to balance slowly changing deviations.

German Published Patent Application No. 196 42 343 describes a method used to regulate the focusing of a light beam of a scanning device directed onto a rotating recording medium to read data on the recording medium and the guidance of the light beam along the data tracks of the recording medium by at least one closed-loop control circuit. However, only translatory movements of the scanning device caused by vibrations in a lower frequency range up to approximately 100–200 Hz are correctable by this method. Vibrations in a frequency range above this limit cannot be compensated.

The manufacturing conditions cause fit tolerances among the individual components which cause them to undergo shocklike movements under vibration. However, the high-frequency components contained in the shocklike movements overtax the electronic regulating devices of the optics. This results in a malfunction of the read-write function.

These problems are illustrated in FIGS. 5a, 5b, and 6.

FIGS. 5a and 5b illustrate the presence of a fit tolerance 4 between a guide device 11 which guides scanning head 10 along a predefined track and a bearing device 12 for the support of guide device 11.

For cost reasons, scanning head 10 is guided on the other side only by a forked guide element.

For the sake of greater comprehensibility, pivot 20 and a section of data track 21 of recording medium 2 are shown in FIG. 5.

FIG. 6 shows a diagram of the vibration curves of the scanning head and of the entire recording device under acceleration events in the case of the presence of fit tolerances. A relative movement between the scanning head and the recording device due to inertia forces and the fit tolerance is clearly recognizable.

SUMMARY OF THE INVENTION

An object of the present invention is generally to eliminate the fit tolerance between the scanning head or the bearing device attached to it and its guide device.

It is generally attempted to keep the fit tolerances of the sliding bearings as low as possible. In practice, requirements with regard to robustness (e.g., sensitivity to temperature and moisture variations, contaminations), service life, production capabilities, production tolerances and production costs place such narrow limits on these methods that it is impossible to prevent a relative movement of the scanning head at even low vibration.

The idea on which the present invention is based is that the optical scanning device has at least one elastic prestressing device to apply a static pre-stress of a specific magnitude and direction to the guide device in order to prestress it and the bearing device connected to the scanning head against each other.

In contrast to the known approaches, the optical scanning device of the present invention has the advantage that the scanning head is guided reliably and free from play even in the presence of vibrations and consequently the resistance to shock is increased. Using the invention makes it possible to reduce the vibration sensitivity of optical data scanning devices. This thus eliminates a weakness of many scanning devices available on the market and increases the selection of possible types for vibration-relevant uses.

The scanning device according to the present invention is the most efficient way to achieve the objective described since as a rule, it is only necessary to make slight design modifications on already existing components.

According to a preferred enhancement, the scanning head has a lens to focus a light beam onto the recording medium.

According to another preferred enhancement, the guide device is embodied as a shaft having helical grooves and may be driven by a motor, an electric motor in particular. The motor is used to induce a rotational movement in the shaft which is converted into a linear movement of the scanning head.

According to another preferred enhancement, the bearing device is made up of a bearing shell to accommodate the guide device and of an elastic matrix element coupled to the scanning head. The elasticity of the matrix element makes it possible to apply a force of a predefined magnitude and direction to the guide device.

According to another preferred enhancement, the matrix element has a plurality of teeth which engage the grooves of the guide device to convert the rotational movement of the guide device into a linear movement of the scanning head. The sizes of the grooves and the corresponding teeth are matched to ensure good guidance. This makes it possible to control the movement of the scanning head on the predefined radial track using the motor.

According to another preferred enhancement, the prestressing device is embodied as a spring element, as a leaf spring in particular, which may be attached to the elastic matrix element in such a manner that it is possible to press the plurality of teeth using a static prestress of a predefined magnitude and direction against the guide device. This eliminates the play between the guide device and the bearing device.

Thus the matrix element including the teeth applied to it assumes not only the function of a radial guidance but also the function of eliminating the fit tolerance of the relevant components. As a result, the scanning head is held rigid even under high-frequency vibrations in that the magnitude and direction of the prestress is determined in advance according to the strength and direction of the acceleration taking place.

According to another preferred enhancement, the prestressing device is embodied as an additional spring element which is attached in the at least one bearing device connected to the scanning head for applying a static prestress of a predefined magnitude and direction to the at least one guide device in order to prestress it and the bearing device against each other. This offers the advantage that it is only necessary to modify already existing parts slightly for improved resistance to shock in conventional drives. This type of tolerance fit elimination is thus a cost-effective means to achieve the objective.

According to another preferred enhancement, the recording medium is embodied, e.g., as a compact disc (CD), a digital video disc (DVD), a minidisc (MD) or as or as a magnetooptic disc (MOD). Since the mechanics of related storage media operate according to the same principle, namely a rotating medium and a linearly adjustable scanning head, the present invention is also applicable to all recording media functioning in this manner.

BRIEF DESCRIPTION OF THE DRAWINGS

FIG. 3 shows a view in cross-section along line H—H from FIG. 2.

FIG. 4 shows a top view of a spring element in installed condition according to a second exemplary embodiment of the present invention.

FIG. 5b shows an enlarged view of the part of the optical scanning device labeled A in FIG. 5a.

DETAILED DESCRIPTION

In the figures, identical reference symbols denote identical components or those having identical functions.

Figure 1:
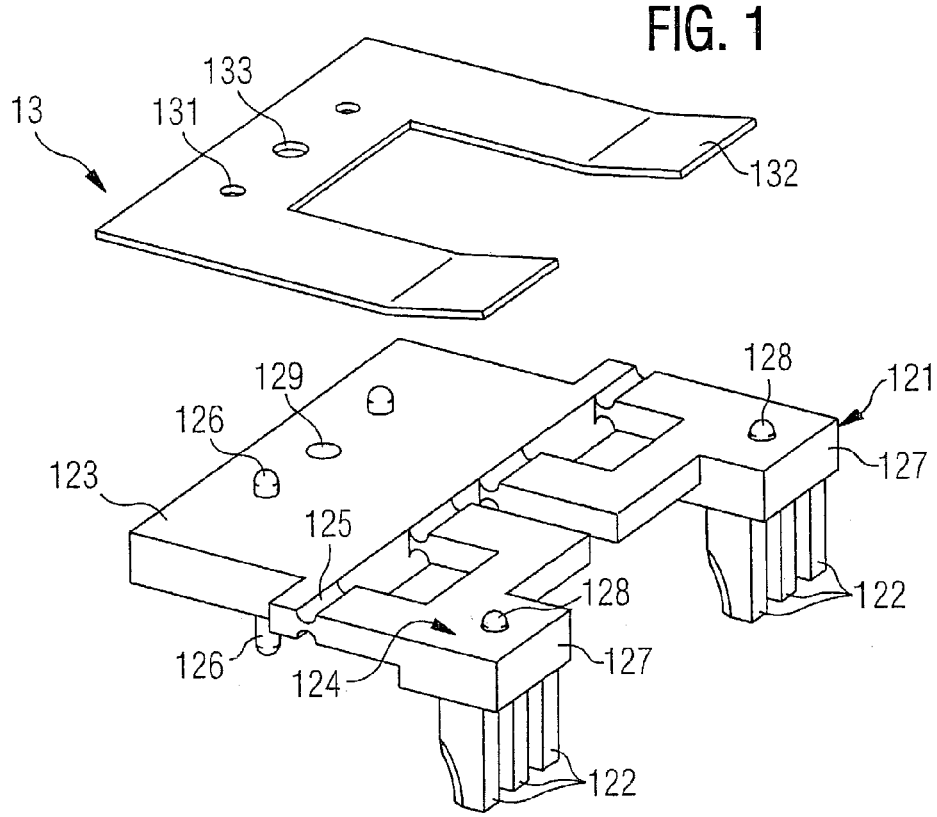
FIG. 1 shows a perspective view of a matrix element and a spring element according to a first embodiment of the present invention.
Figure 2:
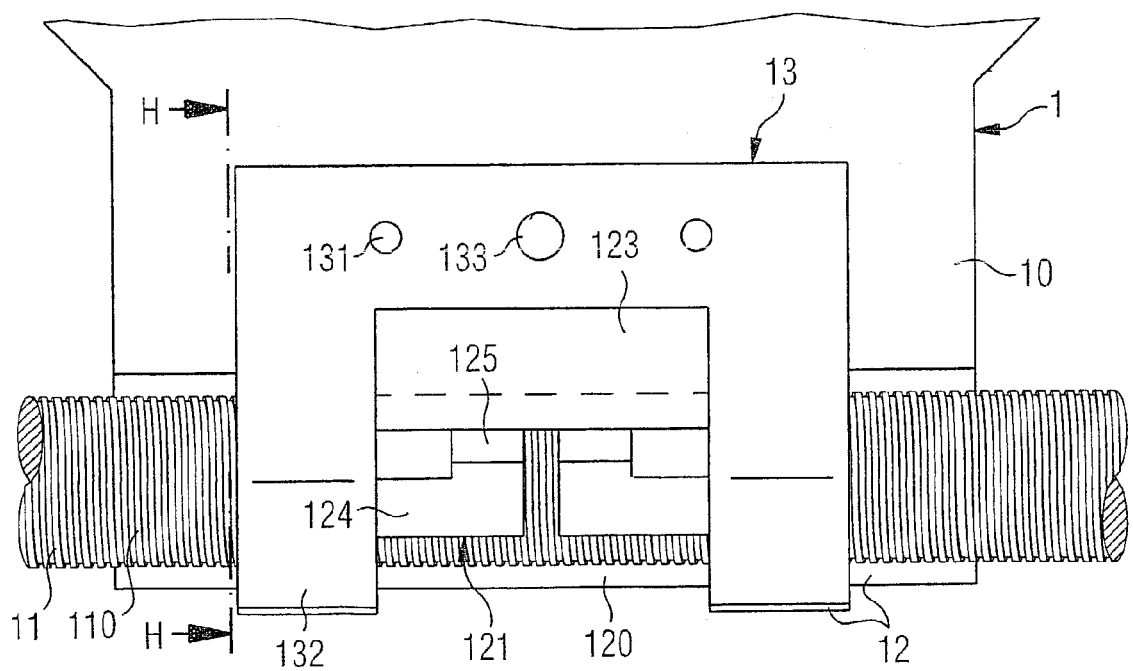
FIG. 2 shows a top view of the matrix element including the spring element in installed condition according to the first exemplary embodiment of the present invention.

FIG. 1 shows a perspective view of an elastic matrix element 121 which is embodied as a part of a bearing device 12 to accommodate a guide device 11 shown in FIG. 2 and a correspondingly embodied prestressing device 13 in the form of a leaf spring 13 according to a first exemplary embodiment of the present invention.

Matrix element 121 is made of a back section 123, which may be affixed to scanning head 10, and a front section 124, which is elastically connected to back section 123, both the top and bottom of connection point 125 between back section 123 and front section 124 being formed in the shape of a channel and thus being used as a hinge for an elastic movement. Due to the recess at connection point 125, the stiffness is reduced there compared to the back and front section and connection point 125 acts as a hinge when force is applied to front section 124.

In addition, a through hole 29 as well as pins 126 are placed both at the top and at the bottom of back section 123.

Front section 124 has two arms 127, each of which has a plurality of teeth 122 on its bottom and a contact point 128 on its top.

Prestressing device 13, also shown in FIG. 1 and embodied as a leaf spring 13, has two symmetrical holes 131 which assume a shape appropriate to accommodate pins 126 on the top of back section 123 of matrix element 121, and a hole 133 situated between the two holes 131, this hole being formed to match through hole 129. The use of additional fastening elements, which are not shown here, makes it possible to attach leaf spring 13 to the matrix element and it in turn to scanning head 10.

Leaf spring 13 has a U shape, its two ends 132 being bent up somewhat at bending points in both legs.

FIG. 2 illustrates matrix element 121 according to the first exemplary embodiment of the present invention as installed on scanning head 10.

Matrix element 121 together with leaf spring 13 is attached using a screw which may be inserted into overlapping holes 129 and 133 of the back section and of the leaf spring.

A bearing shell 120 is connected to scanning head 10, the bearing shell together with matrix element 121 forming the for entire bearing device 12 to support guide device 11, the guide device in this exemplary embodiment being embodied in the form of a spindle shaft 11 having helical grooves 110.

Spindle shaft 11 is driven by an electric motor, which is not shown, to produce rotational movements and is located in bearing shell 120 of scanning head 10.

A cross-section along line H—H from FIG. 2 is shown in FIG. 3, a portion of recording medium 2 being also depicted above the system for improved comprehensibility.

The principle and the function of the first exemplary embodiment of the present invention is illustrated in this sectional view.

Spindle shaft 11 is located in bearing shell 120 of scanning head 10. Teeth 122 are designed in such a manner that they are in contact with the tooth faces of grooves 110 of spindle shaft 11 and as a result convert the rotational movement of spindle shaft 11 into a linear movement of the scanning head along the radial track.

Figure 5B:
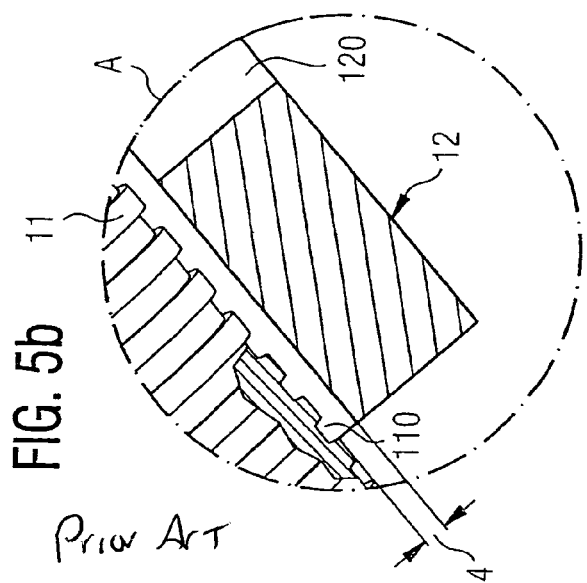
Figure 5A:
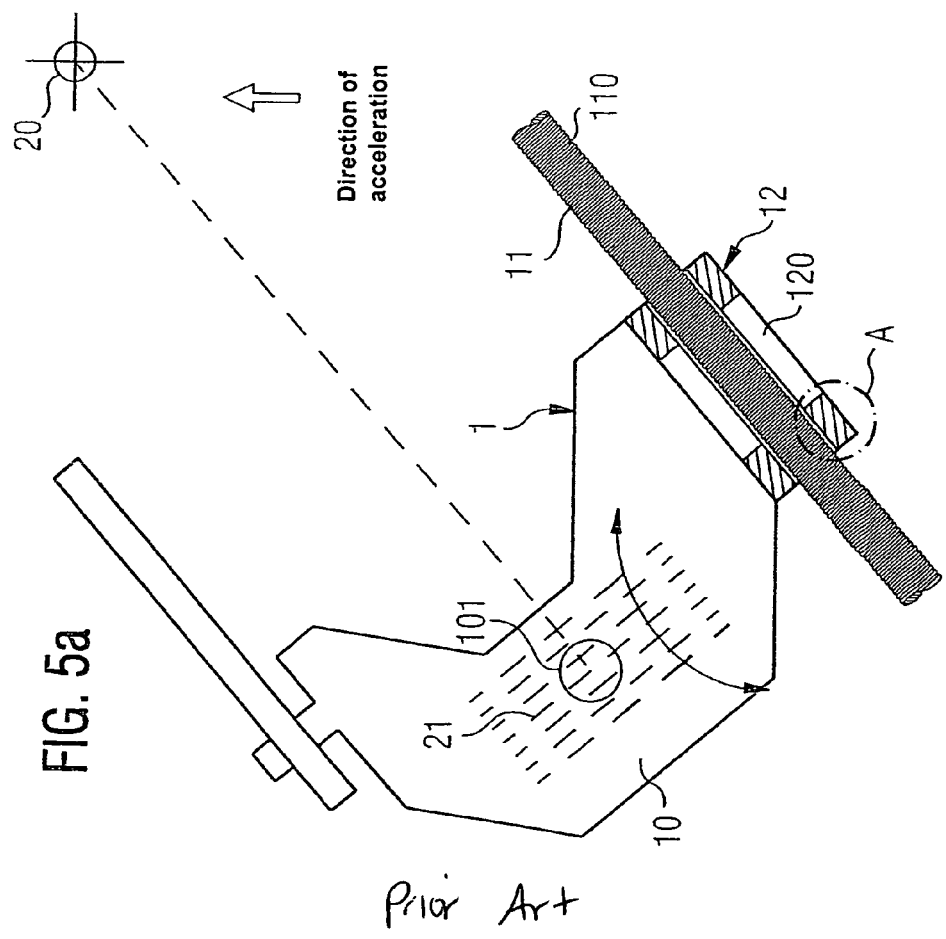
FIG. 5a shows a top view of an optical scanning device.
Figure 6:
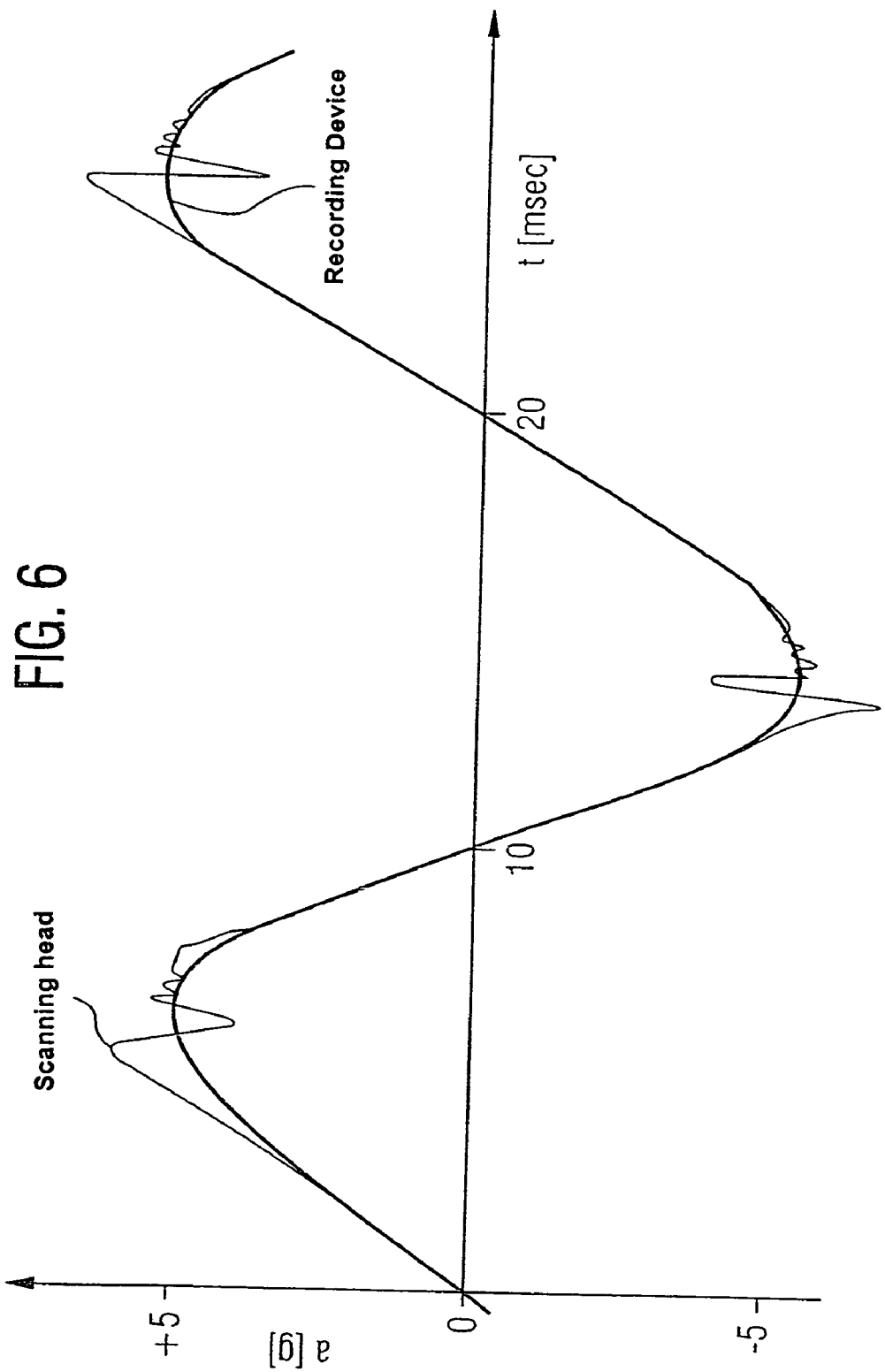
FIG. 6 shows a diagram of the vibration curves of the scanning head and of the entire data recording device in an acceleration event when fit tolerances are present.

However, as may be seen in FIG. 5a, without prestressing device 13, a gap 4 exists between teeth 122 and the spindle surface since both components are subject to tolerances. Bearing shell 120 also has a fit tolerance.

When such a device is installed in, e.g., a motor vehicle, it is exposed to specific accelerations, due to which the device experiences vibrations. Accelerations in the direction of the plane of recording medium 2, which are applied parallel to the direction of travel of scanning head 10, are in particular critical with respect to vibrations and accordingly for an interruption of data reading.

For that reason, the direction and magnitude of the prestress acting on spindle shaft 11 by means of prestressing device 13 must be determined appropriately in advance with respect to both a specific direction, namely in the plane of the acceleration occurring, and with respect to the force occurring as a result of the acceleration. The necessary elastic force of leaf springs 13 in the direction which is favorable in particular to prestressing the components involved with respect to the acceleration occurring is determined in advance with consideration of specific factors such as mass and center of gravity of the scanning head and the force of acceleration acting on the device in the special application. Spring element 13 is selected appropriately and is installed accordingly.

For matrix element 121 to also be able to exert prestressing force on spindle shaft 11, in addition to the function of converting the rotational movement of spindle shaft 11 into a linear movement of scanning head 10, leaf spring 13 is attached to matrix element 121 in such a manner that the elastic force acting on contact point 128 of matrix element 121 exerts a force on spindle shaft 11 and presses it against the bearing shell wall at least two places by means of the lever at connection point 125 of matrix element 121. An appropriate design of front section 124 of matrix element 121 makes it possible to divert this prestress so that a sufficiently great force component is effective in the plane of the medium.

In motor vehicles, accelerations reaching a maximum of 5 g occur in the plane of the medium. From this, it is possible to calculate the force acting on spindle shaft 11 in acceleration events. Accordingly, spring element 13 must be selected in such a way that it exerts a prestress transferred to spindle shaft 11 via teeth 122 with a sufficiently great force component in the plane of the medium perpendicular to the spindle shaft and thus prestresses spindle shaft 11 against bearing shell 120 even if the maximum acceleration force occurs.

Similarly, it is possible to select the angle of the prestress relative to the plane of the medium by a special design of the system. Since, however, as mentioned above, accelerations in the direction of the plane of the medium parallel to the direction of travel of scanning head 10 are critical in particular, the angle must be selected to be as small as possible for as great as possible a prestress relative to this direction.

In order to prevent scanning head 10 from tipping relative to spindle shaft 11, it is necessary to exert an appropriate prestress on spindle shaft 11 using the two arms 127 of front section 124 at least two points spaced apart by a predefined amount to prevent a torque. This ensures that the spindle is pressed onto the wall of bearing shell 120 opposite teeth 122 at least two different points. As a consequence, scanning head 10 does not tip or turn even in the presence of vibrations in an upper frequency range.

FIG. 4 illustrates a second exemplary embodiment of the present invention.

In this exemplary embodiment, leaf spring 13 from the first exemplary embodiment is replaced by an additional spring element 1300.

Spring element 1300 is inserted, for example, in bearing device 12 or in bearing shell 120 connected to scanning head 10, spring element 1300 being attached to a wall opposite spindle shaft 11 parallel to the plane of the medium and engaging two adjacent points on spindle shaft 11.

Again, such a spring element 1300 must be selected to have adequate elastic force to counteract the acceleration forces occurring when driving and to create a continuous prestress of spindle shaft 11 and scanning head 10 or bearing shell 120 relative to each other.

As a result, the scanning head is guided reliably and free from play even in the event of vibration due to only a slight modification to the already existing parts. Thus the present invention eliminates a notorious weakness of the drives cited above and represents the most efficient way to implement damperless drives.

When used in conventional drives, a noticeable improvement, even by a factor of 2 to 3 in the most favorable cases, is attained in vibration performance, in vertical installation in particular. The expected advantage is so great that it is worthwhile to install it in existing products, even considering the expense of modification.

Although the present invention has been described above on the basis of a preferred embodiment, it is not limited to it but instead is modifiable in a variety of ways.

What is claimed is:

1. An optical scanning device for reading data stored on a rotating recording medium, comprising:
   a scanning head;
   at least one guide device for guiding the scanning head along a predefined track;
   at least one bearing device connected to the scanning head and for supporting the scanning head on the at least one guide device; and
   at least one elastic prestressing device for providing a static prestress on the at least one guide device in order to prestress the at least one guide device and the at least one bearing device connected to the scanning head against each other, wherein the static prestress acts at an angle to a plane of the recording medium in such a manner that the static prestress acts both perpendicular and parallel to the plane, wherein the at least one elastic prestressing device includes a leaf spring;
   wherein:
      the at least one bearing device includes:
         a bearing shell for accommodating the at least one guide device, and
         an elastic matrix element coupled to the scanning head.

2. The device as recited in claim 1, wherein:
   the elastic matrix element includes a plurality of teeth that engage grooves of the at least one guide device to convert a rotational movement of the at least one guide device into a linear movement of the scanning head.

3. An optical scanning device for reading data stored on a rotating recording medium, comprising:
   a scanning head;
   at least one guide device for guiding the scanning head along a predefined track;
   at least one bearing device connected to the scanning head and for supporting the scanning head on the at least one guide device; and
   at least one elastic prestressing device for providing a static prestress on the at least one guide device in order to prestress the at least one guide device and the at least one bearing device connected to the scanning head against each other, wherein the static prestress acts at an angle to a plane of the recording medium in such a manner that the static prestress acts both perpendicular and parallel to the plane, wherein the at least one elastic prestressing device includes a leaf spring;
   wherein:
      the leaf spring is mounted in the at least one bearing device, connected to the scanning head, for applying a static prestressing force of predetermined size and direction to the at least one guide device for bracing the at least one guide device and the at least one bearing device against each other.

4. An optical scanning device for reading data stored on a rotating recording medium, comprising:
a scanning head;
at least one guide device for guiding the scanning head along a predefined track;
at least one bearing device connected to the scanning head and for supporting the scanning head on the at least one guide device; and
at least one elastic prestressing device for providing a static prestress on the at least one bearing device, and on the at least one guide device via the at least one bearing device, in order to prestress the at least one guide device and the at least one bearing device against each other, wherein the static prestress acts at an angle to a plane of the recording medium in such a manner that the static prestress acts both perpendicular and parallel to the plane.

5. The device as recited in claim 4, wherein:
the scanning head includes a lens to focus a light beam onto the recording medium.

6. The device as recited in claim 4, wherein:
the at least one guide device includes a shaft having helical grooves.

7. The device as recited in claim 4, wherein:
the at least one guide device is drivable by a motor.

8. The device as recited in claim 4, wherein:
the at least one bearing device includes:
    a bearing shell for accommodating the at least one guide device, and
    an elastic matrix element coupled to the scanning head.

9. The device as recited in claim 8, wherein:
the elastic matrix element includes a plurality of teeth that engage grooves of the at least one guide device to convert a rotational movement of the at least one guide device into a linear movement of the scanning head.

10. The device as recited in claim 9, wherein:
the at least one elastic prestressing device includes a spring element that is attachable to the elastic matrix element in such a manner that it is possible to press the plurality of teeth having the static prestress of a predefined magnitude and direction against the at least one guide device.

11. The device as recited in claim 10, wherein:
the spring element includes a leaf spring.

12. The device as recited in claim 4, wherein:
the at least one elastic prestressing device includes a spring element that is mounted in the at least one bearing device, connected to the scanning head, for applying a static prestressing force of predetermined size and direction to the at least one guide device for bracing the at least one guide device and the at least one bearing device against each other.

13. The device as recited in claim 4, wherein:
the recording medium includes one of a compact disc, a digital video disc, a minidisc, and a magnetooptic disc.

14. The device as recited in claim 4, wherein:
the at least one elastic prestressing device includes a leaf spring.

* * * * *